United States Patent
Mathai et al.

(10) Patent No.: US 10,316,926 B2
(45) Date of Patent: Jun. 11, 2019

(54) HYDRAULIC ENGINE MOUNT

(71) Applicant: Ford Global Technologies, LLC, Dearborn, MI (US)

(72) Inventors: Thomas Mathai, Farmington, MI (US); Nick Hufnagel, Pinckney, MI (US); Kevin Stark, Windsor (CA); Ralph Robert Jones, Dearborn, MI (US); Bhavin Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 15/256,254

(22) Filed: Sep. 2, 2016

(65) Prior Publication Data

US 2018/0066727 A1     Mar. 8, 2018

(51) Int. Cl.
*F16F 13/10*     (2006.01)
*B60K 5/12*      (2006.01)

(52) U.S. Cl.
CPC .......... *F16F 13/103* (2013.01); *B60K 5/1208* (2013.01); *F16F 13/10* (2013.01); *F16F 2224/04* (2013.01); *F16F 2226/04* (2013.01)

(58) Field of Classification Search
CPC ...... F16F 13/10; F16F 13/103; F16F 2226/04; B60K 5/1208
USPC ........................................ 267/140.11, 140.13
See application file for complete search history.

(56) References Cited

U.S. PATENT DOCUMENTS

| 4,199,128 | A |   | 4/1980  | van den Boom et al. |
|-----------|---|---|---------|---------------------|
| 4,428,569 | A | * | 1/1984  | Takei .............. F16F 9/04 267/140.11 |
| 4,643,405 | A |   | 2/1987  | Hofmann et al. |
| 4,840,358 | A |   | 6/1989  | Hoying et al. |
| 4,901,986 | A |   | 2/1990  | Smith |
| 5,628,498 | A | * | 5/1997  | Nanno ............. F16F 13/10 267/140.13 |
| 5,735,510 | A | * | 4/1998  | Takehara ......... F16F 13/20 188/269 |
| 5,823,515 | A | * | 10/1998 | Takehara ......... F02B 75/34 267/140.13 |
| 6,361,031 | B1 |  | 3/2002  | Shores et al. |
| 6,491,290 | B2 |  | 12/2002 | Muramatsu et al. |
| 7,044,456 | B2 | * | 5/2006 | Okanaka .......... F16F 13/101 267/140.13 |
| 9,016,673 | B2 | * | 4/2015 | Asano ............. F16F 13/08 267/140.13 |
| 9,328,794 | B2 | * | 5/2016 | Casimir .......... F16F 13/268 |
| 9,447,837 | B2 | * | 9/2016 | Kanaya ........... F16F 13/103 |
| 9,566,856 | B2 | * | 2/2017 | Furumachi ....... F16F 13/107 |

(Continued)

FOREIGN PATENT DOCUMENTS

CN  103635711 A   3/2014
EP    0009120 A1  4/1980

*Primary Examiner* — Thomas W Irvin
(74) *Attorney, Agent, or Firm* — Julia Voutyras; McCoy Russell LLP

(57) ABSTRACT

Methods and systems are provided for manufacturing a hydraulic engine mount. During assembly, one or more gel caps may be inserted into a chamber of the engine mount, the chamber is then filled with a fluid and sealed to allow the gel caps to dissolve. Upon dissolving, the gel caps may release air bubbles to reduce pressure differentials across the engine mount to reduce occurrence of cavitation and NVH issues.

20 Claims, 4 Drawing Sheets

(56) References Cited

U.S. PATENT DOCUMENTS

2014/0197585 A1   7/2014   Casimir et al.
2015/0028530 A1*  1/2015   Kanaya ................ F16F 13/103
                                              267/140.13

* cited by examiner

HYDRAULIC ENGINE MOUNT

FIELD

The present description relates generally to methods and systems for manufacturing a hydraulic engine mount of a vehicle engine, and to the hydraulic engine mount itself and a related product line.

BACKGROUND/SUMMARY

Hydraulic engine mounts may be attached to a vehicle body or other suitable vehicle component to attenuate engine noise, vibration and harshness (NVH) to acceptable thresholds. Hydraulic engine mounts may be provided in different configurations to allow engine mount performance under a wide range of vehicle operating conditions. For example, an engine mount may be designed to provide hydraulic damping under both idle engine and motive engine conditions. As such, performance requirements of the engine mount may vary, introducing competing requirements. For example, high damping needed during engine motive conditions may increase incidence of parasitic noise, which is structure borne rather than airborne. In this case, the parasitic noise may not become apparent until prior to vehicle launch. Additional changes made to the engine mount during late stages in production may be costly and detrimental to vehicle performance.

During engine operation, a decoupler in an engine mount may come in contact with a channel plate producing low amplitude noise, with peak to peak amplitude of at least 2 mm. Another problem in an engine mount is cavitation phenomena which occurs when a local fluid pressure falls below fluid vapor pressure as the fluid flows through the engine mount producing gas bubbles. The generated gas bubbles may grow larger and later collapse rapidly against internal walls of the engine mount causing pitting or destruction of the walls and other engine components. Further, cavitation may be accompanied by production of high amplitude noise, with peak to peak amplitudes of at least 8 mm.

An example engine mount is disclosed by van den Boom in U.S. Pat. No. 4,199,128. Therein, the engine mount with a main housing containing an elastic wall connected to a force transmitting member formed with an opening fluidly connected to the main housing. Pressure differentials within the engine mount are primarily controlled by fluid transfer between internal chambers via the opening, and deformation of the elastic wall.

However, in the example engine mount disclosed above, it may be difficult to change or adjust engine mount parameters (such as stiffness and damping parameters) once the engine mount has been assembled or during later stages in engine production, prior to vehicle launch. Further, the cavitation phenomena, which often occurs in engine mounts and other engine components, may be particularly prevalent in such a design.

The inventors herein have recognized the various issues discussed above, and developed a hydraulic engine mount to at least partially address them. In one example, a method for manufacturing a hydraulic engine mount, may comprise: inserting air filled dissolving caps into a chamber below a rubber damper; and filling the chamber with a fluid and sealing the chamber. In this way, one method for manufacturing the hydraulic engine mount may be used to reduce pressure differentials across the engine mount to reduce or minimize cavitation while addressing noise, vibration and harshness (NVH) issues.

For example, an air filled dissolving gel cap may be inserted into a chamber of the hydraulic engine mount, the chamber filled with glycol solution and sealed. The gel cap may dissolve in the glycol solution and release air bubbles to reduce pressure differentials across the engine mount. By releasing air bubbles in the chamber, pressure differentials across the hydraulic engine mount may be reduced or minimized. In this way, cavitation occurrence during engine operation may be addressed while reducing undesirable noise and vibration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 is shown to scale, although other relative dimensions may be used, if desired.

DETAILED DESCRIPTION

The following description relates to systems and methods for manufacturing a hydraulic engine mount. A structure of the hydraulic engine mount including different components of the engine mount is disclosed at FIG. 1. Further, methods for manufacturing the hydraulic mount are disclosed at FIGS. 2-3. The first method disclosed in FIG. 2, includes inserting one or more gel caps in a chamber of the hydraulic engine mount, the chamber is filled with a fluid such as glycol solution and sealed, enabling the cap to dissolve. Upon dissolving, the gel cap releases air bubbles to reduce pressure differentials across the hydraulic engine mount. The second method disclosed in FIG. 3, involves introducing air by a dry fill process. Both methods may be implemented via the hydraulic engine mount disclosed at FIG. 1 or may be implemented via another suitable engine mount. In this way, both manufacturing methods reduce pressure differentials within the engine mount to reduce occurrence of cavitation in the engine mount. FIG. 4 shows a product line with a first engine mount coupled to a first engine with a first engine mass, and a second engine mount coupled to a second engine, with a different engine mass. Each of the first and second engine mount are of engine mount type disclosed at FIG. 1, manufactured by process of FIG. 2. Alternatively, the second engine mount may be manufactured by process of FIG. 3. In this way, the product line may take advantage of benefits of both types of engine mounts.

Figure 1:
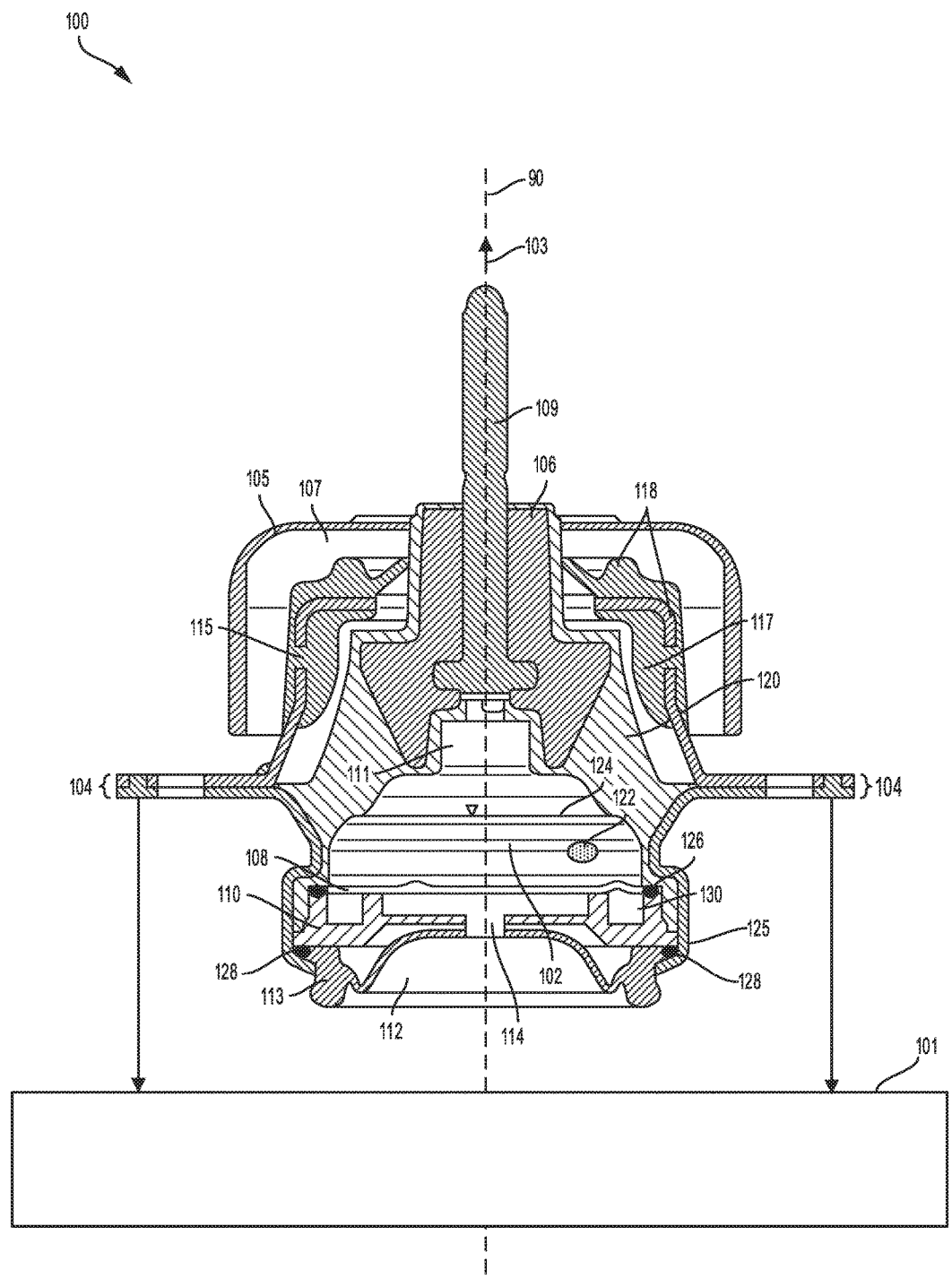
FIG. 1 shows a cross sectional view of a hydraulic engine mount of a vehicle system.

FIG. 1 shows an example hydraulic engine mount configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figure, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figure may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Referring to FIG. 1, a structure of the hydraulic engine mount including various components of the engine mount is shown. The hydraulic engine mount depicted in FIG. 1 may be used to attach an engine to a vehicle body or other suitable vehicle components. The hydraulic engine mount comprises mount housing 105 with internal walls 107, main rubber element 120 mounted within a central opening of the mount housing. The main rubber element has an internal slot to receive annular collar 106 with a centrally projecting engine side insert 109 for attachment to an engine at placed at an upward location shown by arrow 103, along mount axis 90. As an example, the main rubber element may be a rubber damper to reduce or attenuate vibration produced during engine operation. In one example, the main rubber element has desirable stiffness and damping capability to mitigate or absorb both low and high amplitude noise generated during vehicle operation.

A travel limiter 118 with side openings 115 (at each diametric end), may be mounted in the mount housing such that outer surfaces of the travel limiter abut against inner surfaces of the internal walls of the housing, with main rubber element 120 contiguously installed into an interior slot in the travel limiter. In one example, the travel limiter may be positioned above the main rubber element. The side openings 115 allow fluid transport into and out of internal passage 117 during engine operation. Annular boss 111 whose top end is connected to the engine side insert 109, connects to an opening in a top portion of chamber 102, allowing vibrations from the engine to be transmitted to a fluid in the chamber. In this way, engine vibrations may be dissipated by the fluid in the chamber.

When the engine mount is assembled, gel cap 122 may be inserted into the chamber. In one example, one or more gel caps may be placed in direct contact with upper channel plate 108. For example, size of the dissolving gel cap may be selected based on a predicted powertrain mass of the engine coupled to the engine mount. In one example, a large diameter dissolving cap may be selected for a high powertrain mass. In another example, a small diameter dissolving cap may be selected for a low powertrain mass. In other examples, the size of the dissolving cap may be selected based on volume of glycol used and amount of damping required. In one example, a large diameter gel cap may be selected when a large volume of glycol solution is used and a high damping level is required. In this case, a higher propensity for parasitic noises requires a large diameter gel cap to reduce the noise to threshold levels. Alternatively, a small diameter gel cap may be selected when a small volume of glycol solution is used and a low damping level is required.

After inserting the gel cap, the chamber may be filled with fluid 124. For example, the fluid in the chamber may comprise glycol. The chamber may be permanently sealed after inserting the gel cap and filling the chamber with the fluid. The gel cap may dissolve in the fluid and release air bubbles to reduce pressure differentials generated in the engine mount during vehicle operation. By reducing pressure variation across the engine mount, occurrence of cavitation and vibration caused during engine operation may be reduced or minimized.

An upper channel plate 108, mounted at a base region of the chamber, is supported by lower channel plate 110 which has an inertial track 130 and an orifice for mounting decoupler 114. For example, the chamber may be formed by the main rubber element and may be positioned above both the upper channel plate and lower channel plate, and the inertia track may be positioned below upper seal 126. As shown, the main rubber element may be below and in direct contact with the engine side insert. The upper channel plate may control exchange of fluid between the chamber and bellow 112 (positioned below the lower channel plate), via the orifice. In one example, the main rubber element may be in direct contact with the fluid. The upper seal 126 prevents glycol leaks from the inertial track or hydraulic channel. During engine operation, the decoupler may reciprocate between the upper channel plate and top of the bellow in response to vehicle vibrations. As a result, a top surface of the decoupler may come in contact with a bottom surface of the upper channel plate, creating low amplitude noise. In one example, the low amplitude noise may have a peak to peak amplitude of at least 2.0 mm. The low amplitude noise produced when the decoupler hits against the upper channel plate, may create undesirable noise if not adequately dissipated or damped.

The bellow provides a low pressure expansion chamber for the fluid released from the chamber via the orifice at a top end of the bellow. An armature 113 placed circumferentially on the bellow, provides a sealing structure between bellow and mount housing. Outer closure 125, provides an outer cover for a lower portion of the engine mount. Lower seal 128 placed between an inner surface of the outer closure and circumference of the bellow, seals off the lower portion of the engine mount. A body side insert 104, at each diametric end of the engine mount, may provide a means for attachment to vehicle body or chassis 101. For example, when the vehicle is in operation, vibrations from the engine may be transmitted to the fluid in the bellow, where vibration energy may cause the decoupler to reciprocate between the bellow and upper plate, along mount axis 90. As a result, motion of the decoupler may dampen or attenuate vibrations from the engine, ensuring smooth vehicle operation.

In this way, a method for manufacturing a vehicle, may comprise: forming a hydraulic engine mount by inserting air filled dissolving caps into a chamber below a rubber damper, filling the chamber with glycol, and permanently sealing the chamber, wherein a size of the dissolving caps may be selected based on a predicted damping requirement and associated parasitic noises; mounting the engine in the vehicle via the mount.

Figure 2:
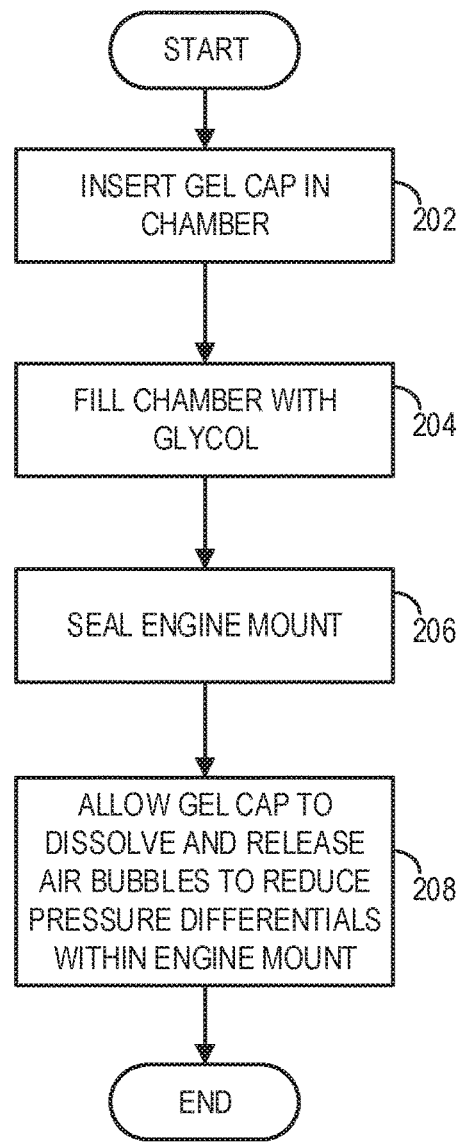
FIG. 2 shows a first example method for manufacturing the hydraulic engine mount.

Turning to FIG. 2, a first example method is shown for manufacturing a hydraulic engine mount. The method 200 may be implemented via a hydraulic mount disclosed at FIG. 1 or may be implemented via another suitable engine mount. In this way, the resulting hydraulic engine mount may reduce pressure variations across the engine mount to minimize occurrence of cavitation and reduce noise, vibration and harshness (NVH) to acceptable levels.

At 202, method 200 includes inserting one or more gel caps into chamber 102 of FIG. 1, below main rubber element 120 during assembly of the hydraulic engine mount. The gel cap may be composed of hydroxyl-propyl-methyl-cellulose (HPMC) and purified water, for example. In other examples, the gel cap may be composed of other suitable materials. The size of gel caps inserted into the chamber may be selected based on a level of parasitic noise or cavitation noise induced in the engine mount, and level of damping required. The damping requirements are related to an engine powertrain mass and suspension characteristics. In one example, a large gel cap may be selected when a high level of cavitation noise is induced in the engine mount and a high level of damping is required. In this case, the large gel cap may accommodate a large volume of air and glycol solution to reduce the cavitation noise below a threshold noise level. Alternatively, a small gel cap may be selected when a low level of cavitation noise is induced in the engine mount and a low level of damping is required. In this way, the dissolving gel cap in the engine mount may be proportionately sized to reduce varying levels of parasitic or cavitation noise to threshold levels.

In another example, the size of gel caps inserted into the engine mount may be selected based on the powertrain mass. In one example, a small size gel cap may be selected when the powertrain mass is low, and a large size gel cap may be employed when the powertrain mass is high. In other examples, the size of the gel cap may be selected based on volume of glycol solution inside the engine mount and amount of damping required. In one example, a large size gel cap may be selected when a large volume of glycol is used and a high damping level is required. In this case, a higher propensity for parasitic noises requires a large gel cap to reduce the noise to threshold levels. Alternatively, a small size gel cap may be selected when a small volume of glycol is used and a low damping level is required.

Next at 204, the chamber containing the gel cap may be filled with a fluid. For example, the fluid may comprise ethylene glycol or propylene glycol, or a mixture of ethylene glycol and propylene glycol. The fluid allows the gel cap to dissolve after the fluid filling process as disclosed below. For example, a volume of the fluid filled in the chamber may be proportionate to a number and size of gel caps placed in the chamber.

At 206, the chamber of the hydraulic engine mount may be permanently sealed off by closing the chamber after the engine mount has been assembled. By permanently sealing off the chamber, the gel cap may be allowed to dissolve in the fluid as disclosed below.

At 208, the gel cap dissolves in the fluid filled inside the chamber. For example, the gel cap may dissolve in the fluid comprising glycol solution in 10-15 minutes, after the chamber has been permanently sealed. Upon dissolving in the fluid, gel cap may release air bubbles inside the chamber to reduce pressure variations inside the engine mount during engine operation. In this way, encapsulated air globules may be formed in the fluid without utilizing a special fixture applying a preload of a certain displacement to the mount while injecting the glycol into the inertia track. The reduction in pressure differentials may minimize cavitation noise and vibration. For example, the released air may reduce peak damping (measured at 2.0 mm peak to peak, and 1.0 g preload) by 7-15%. In this way, the air bubbles released into the chamber may reduce pressure differentials within the engine mount to minimize occurrence of cavitation and reduce NVH to acceptable levels.

In this way, a method for manufacturing a hydraulic engine mount may comprise: inserting air filled dissolving caps into the chamber below a main rubber element, the size of the dissolving caps selected based on the predicted required damping and associated parasitic noise; and filling the chamber with the fluid (e.g., glycol) and sealing the chamber.

Figure 3:
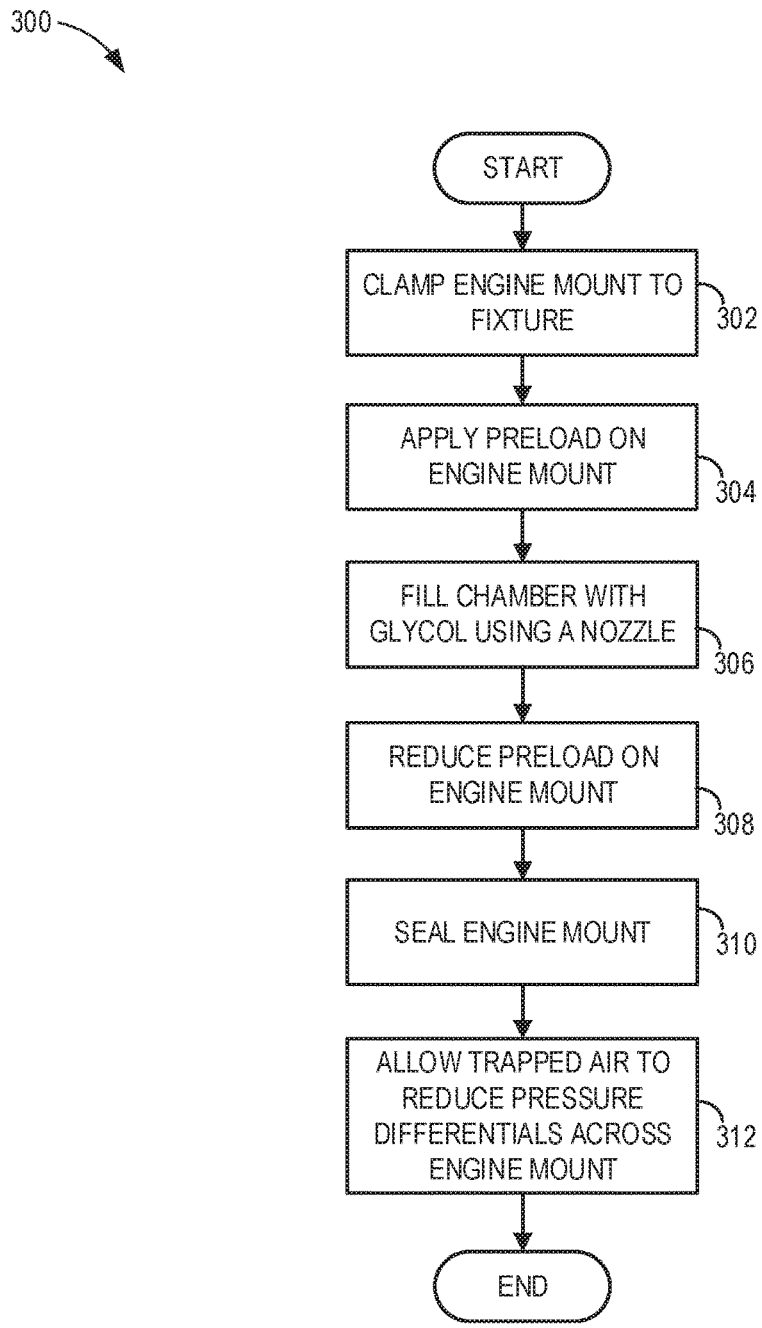
FIG. 3 shows a second method for manufacturing the hydraulic engine mount.
Figure 4:
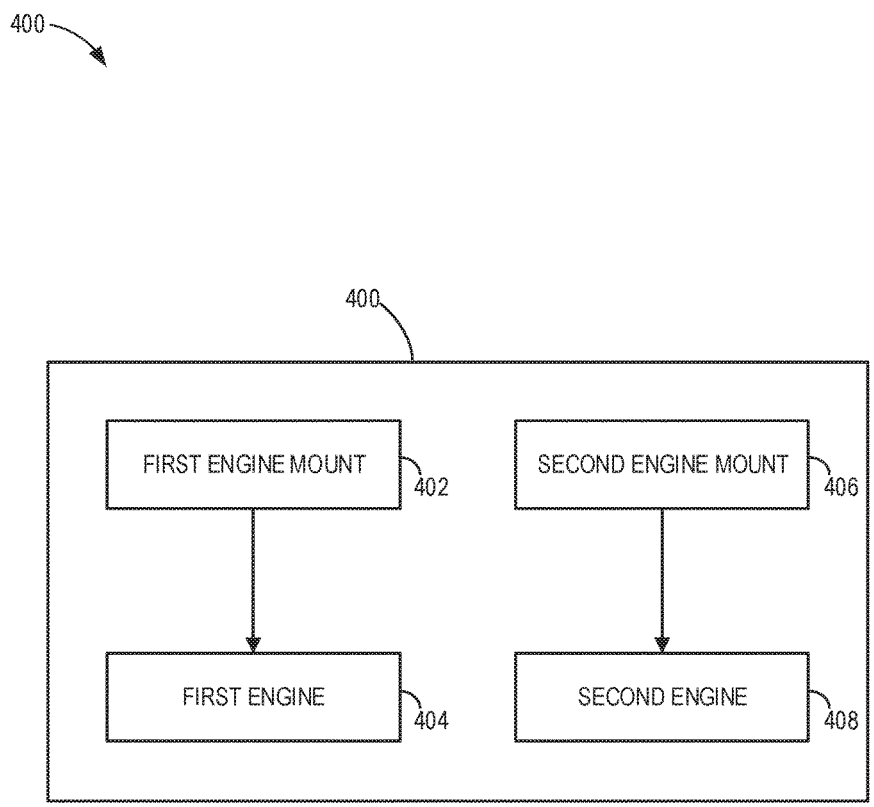
FIG. 4 shows a product line with a first engine mount coupled to a first engine, and a second engine mount coupled to a second engine.

Turning to FIG. 3, a second example method is shown for manufacturing a hydraulic engine mount. The method 300 may be implemented via a hydraulic engine mount disclosed at FIG. 1 or may be implemented via another suitable engine mount. In this way, the manufacturing method allows for reduction in pressure differentials across the engine mount, and may minimize occurrence of cavitation, and reduce vibration to acceptable levels.

At 302, the method 300 includes clamping the hydraulic engine mount in place using a suitable fixture during assembly. Clamping the hydraulic engine mount to the fixture, allows the engine mount to be filled with glycol solution using a dry fill process as disclosed below.

At 304, method 300 involves applying a preload to the hydraulic engine mount via specific fixtures, such as a pneumatic, hydraulic or servo motor controlled ram. Applying the preload may involve displacing the hydraulic engine mount by a magnitude proportionate with an expected powertrain mass. For example, applying the preload may involve displacing the engine mount by a first displacement proportionate with a first powertrain mass. The engine mount preload displacement may be related to a static load on the mount due to a powertrain mass. In one example, the first powertrain load may result in a static load on the engine mount in a range of 400 to 5000 N.

Next at 306, the chamber may be filled using a dry fill process using glycol fluid comprising ethylene glycol or propylene glycol or a mixture of ethylene glycol and propylene glycol. The dry fill process involves filling the chamber with the glycol fluid while the hydraulic engine mount is clamped. A nozzle may be inserted into an inertia opening (such as inertial track 130 at FIG. 1) to dispense glycol solution into the engine mount. For example, volume of glycol solution filled in the chamber may be proportionate to engine mass and required damping levels.

At 308, the fixture may be adjusted to reduce the preload on the hydraulic engine mount by an amount proportionate to an air volume needed to reduce pressure differentials across the engine mount. The air is introduced in the mount system via preloading the engine mount by a certain displacement. For example, a displacement of 0.8 mm during preloading may produce an air pocket of 2 ml in the engine mount, after the mount has been dry filled and the preload released. For example, the preload on the engine mount may be reduced by applying a second displacement to the mount based on the volume of air needed to reduce pressure variations across the engine mount by a first threshold amount. In one example, the first threshold amount may be proportionate to a pressure reduction that reduces cavitation inside the engine mount.

At 310, the chamber of the engine mount may be permanently sealed. By allowing air inside the chamber to diffuse, pressure variations across the engine mount may be reduced. In this way, reduction in pressure differentials across the hydraulic engine mount may reduce occurrence of cavitation and vibration.

Referring to FIG. 4, an example product line 400 is provided, which may include a plurality of vehicles. The product line may, in one example, comprise a first engine mount coupled to a first engine, and a second engine mount coupled to a second engine, of first and second vehicles. In one example, each of the first and second engine mounts are of the engine mount type described in FIG. 1, manufactured by process of FIG. 2, although with different features as will be explained herein. Alternatively, the second engine mount may be made by process of FIG. 3, whereas the first engine mount is made by the process of FIG. 2. In this way, the product line allows for the first and second engine mount, each engine mount coupled to a different engine, to take advantage of benefits of both types of engine mounts, if desired for different vehicle applications (e.g., where the first vehicle has a different number of cylinders, different vehicle weight, different number of drivable wheels (e.g., 4×2 vs. 4×4 vs. all wheel drive), different rated engine/powertrain power/towing levels, etc.

As shown, product line 400 comprises first engine mount 402 coupled to first engine 404, and second engine mount 406 coupled to second engine 408. The first engine mount may be an engine mount of type disclosed at FIG. 1, attached to a first engine with a first rated power level. The first engine mount may be manufactured by the process of FIG. 2, involving encapsulating air bubbles within the engine mount. Specifically, the process of FIG. 2 may involve inserting a gel cap of a first size into a chamber of the first engine mount, and filling the chamber with a fluid, such as glycol. The chamber of the first engine mount may be permanently sealed off, allowing the gel cap to dissolve in the fluid and release air bubbles inside the chamber. As a result, the air released in the chamber may diffuse across the engine mount, reducing pressure variations within the first engine mount to threshold levels that reduce the occurrence of cavitation.

Similarly, the second engine mount 406 may be an engine mount of type disclosed at FIG. 1, attached to a second engine having a different, e.g., lower/higher rated engine power. For example, the second engine may have a second rated power level, different from the first rated power level. The second engine mount may be manufactured by process of FIG. 2, by inserting a second gel cap with a second size (different from the first size) in the chamber and filling a fluid in the chamber, before permanently sealing. For example, if the first engine mount has a higher powertrain mass than the second engine mount, the second size gel cap inserted in the second engine mount may be smaller in diameter compared to the first size gel cap inserted in the first engine mount. In this case, a larger size gel cap is proportionate to a high powertrain mass while a small size gel cap is proportionate to a low powertrain mass. Note that one way to provide a larger size gel cap is to combine multiple smaller sized gel caps during the manufacture of a single mount. The fluid in the chamber of the second engine mount may comprise glycol solution, for example. Consequently, air may be encapsulated within the chamber as previously disclosed. Specifically, the mount coupled to the first engine may have a higher amount of encapsulated air than the second mount.

Alternatively, the second engine mount may be manufactured by process of FIG. 3, which involves a dry fill process of introducing air into the engine mount. Specifically, the dry fill process may involve clamping the engine mount with a fixture and displacing the second engine mount by a magnitude proportionate with an expected powertrain load on the engine. While in a clamped position, the chamber of the second engine mount may be filled with a glycol solution, and the engine mount displaced by an amount proportionate to an air volume needed to reduce pressure differentials across the engine mount to threshold levels that reduce cavitation. The second engine mount may be sealed and while in operation, the air encapsulated inside the engine mount may reduce pressure variation across the engine mount to acceptable levels that reduce cavitation.

As disclosed above, both the first and second engine mount may be manufactured by process of FIG. 2 by encapsulating air inside each of the first and second engine mount using air dissolving gel cap. Alternatively, the first engine mount may be made by method of FIG. 2 while the second engine mount may be manufactured by process of FIG. 3 involving the dry fill process. In both cases, air released within the first and second engine mount may reduce pressure differentials across each of the first and second engine mount, albeit to different extents, and may reduce occurrence of cavitation in the product line. In this way, the product line may take advantage of benefits of both types of engine mounts, if desired.

In this way, the product line may comprise: a first mount with an air filled dissolving cap inserted into a chamber below a main rubber element, the cap having a first size and the first mount coupled with a first engine having a first engine mass, the chamber filled with a fluid and sealed; and a second mount with a different sized air filled dissolving cap inserted therein and coupled with a second engine having a different engine mass.

In one example, a method for manufacturing a hydraulic engine mount, may comprise: inserting air filled dissolving caps into a chamber below a rubber damper; and filling the chamber with a fluid and sealing the chamber. In the preceding example additionally or optionally, the chamber is permanently sealed. In any or all of the preceding examples, additionally or optionally, the fluid comprises glycol. In any or all of the preceding examples, additionally or optionally, a size of the dissolving caps is selected based on a predicted powertrain mass of an engine coupled with the mount when assembled in a vehicle. In any or all of the preceding examples, additionally or optionally, the size is selected based on powertrain mass of the engine. In any or all of the preceding examples, additionally or optionally, the chamber is formed by the main rubber element and is positioned above both an upper channel plate and a lower channel plate. In the preceding example additionally or optionally, the main rubber element is below and in direct contact with an engine side insert.

Furthermore, in any or all of the preceding examples, additionally or optionally, the cap is placed in direct contact with the upper channel plate. In any or all of the preceding examples, additionally or optionally, the main rubber element has fluid in direct contact therewith. In any or all of the preceding examples, additionally or optionally, a bellow is positioned below a lower channel plate. Any or all of the preceding examples, may additionally or optionally further comprise, forming encapsulated air globules in the fluid without utilizing a special fixture applying a preload of a certain displacement to the mount while injecting the glycol into an inertia track. In the preceding example additionally or optionally, the mount further has a travel limiter above the main rubber element.

An example product line may comprise: a first mount with an air filled dissolving cap inserted into a chamber below a main rubber element, the cap having a first size and the first mount coupled with a first engine having a first engine mass, the chamber filled with a fluid and sealed; and a second mount with a different sized air filled dissolving cap inserted therein and coupled with a second engine having a different engine mass. In any or all of the preceding examples, additionally or optionally, the size of the caps may increase with increase in the engine mass. In any or all of the preceding examples, additionally or optionally, in each of the first and second mounts, the chamber is permanently sealed. In any or all of the preceding examples, additionally or optionally, the fluid is glycol.

A method for manufacturing a vehicle, may comprise: forming a hydraulic engine mount by inserting air filled dissolving caps into a chamber below a main rubber element, filling the chamber with glycol, and permanently sealing the chamber, wherein a size of the dissolving caps is selected based on a predicted powertrain mass; mounting the engine in the vehicle via the mount. In any or all of the preceding examples, additionally or optionally, the mount further includes a bellow armature positioned below a lower channel plate. In any or all of the preceding examples, additionally or optionally, the mount further includes an inertia track positioned below an upper seal.

Note that the example control and estimation routines included herein can be used with various hydraulic engine mount and/or other engine mount configurations. It will be appreciated that the configurations and routines disclosed herein are exemplary in nature, and that these specific embodiments are not to be considered in a limiting sense, because numerous variations are possible. For example, the above technology can be applied to a hydraulic engine mount, and other types of engine mounts. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for manufacturing a hydraulic engine mount, comprising:
    inserting at least one air filled dissolving cap into a chamber below a main rubber element, wherein a number of caps or a size of the at least one cap inserted is based on a mass of a powertrain and a volume of a fluid to be filled; and
    filling the chamber with the fluid and sealing the chamber.
2. The method of claim 1, wherein the chamber is permanently sealed.
3. The method of claim 2, wherein the fluid comprises glycol.
4. The method of claim 1, wherein the size is selected based on a mass of an engine.
5. The method of claim 1, wherein the chamber is formed by the main rubber element and is positioned above both an upper channel plate and a lower channel plate.
6. The method of claim 5, wherein the main rubber element is below and in direct contact with an engine side insert.
7. The method of claim 6, wherein a cap is placed in direct contact with the upper channel plate.
8. The method of claim 7, wherein the main rubber element has fluid in direct contact therewith.
9. The method of claim 8, wherein a bellow is positioned below the lower channel plate.
10. The method of claim 9, further comprising forming encapsulated air globules in the fluid without utilizing a special fixture applying a preload of a certain displacement to the hydraulic engine mount while injecting glycol into an inertia track.
11. The method of claim 10, wherein the hydraulic engine mount further has a travel limiter above the main rubber element.
12. The method of claim 1, wherein the number of caps or size of the at least one cap inserted is further based an amount of induced cavitation noise.
13. The method of claim 1, wherein the number of caps or size of the at least one cap inserted increases with the volume of fluid to be filled.
14. A product line, comprising:
    a first mount with at least a first air filled dissolving cap inserted into a chamber below a main rubber element, the cap having a first size and the first mount coupled with a first engine having a first engine mass, the chamber filled with a fluid and sealed; and
    a second mount with at least a second air filled dissolving cap inserted therein and coupled with a second engine having a different engine mass than the first engine mass; and
    wherein a size of the cap or a number of caps inserted into the second mount is different from the first mount and the size or number of caps is based on an amount of induced cavitation noise and damping requirements based on the second engine mass.
15. The product line of claim 14, wherein the size of the caps increases with increasing engine mass.
16. The product line of claim 15, wherein in each of the first and second mounts, the chamber is permanently sealed.
17. The product line of claim 16, wherein the fluid is glycol.
18. A method for manufacturing engine mounts, comprising:
    forming a first hydraulic engine mount by inserting one or more air filled dissolving caps into a chamber below a main rubber element, filling the chamber with glycol, and permanently sealing the chamber, wherein a size or a number of the dissolving caps inserted is selected based on a predicted powertrain mass and an amount of glycol filled;
    forming a second hydraulic engine mount by filling a second chamber with glycol while the second engine mount is under a preload force, the preload force determined by an engine mass and an air amount within the filled second chamber.

19. The method of claim 18, wherein the first engine mount further includes a bellow armature positioned below a lower channel plate.

20. The method of claim 18, wherein the first engine mount further includes an inertia track positioned below an upper seal.

\* \* \* \* \*